United States Patent
Jacobson et al.

(10) Patent No.: US 7,334,045 B1
(45) Date of Patent: Feb. 19, 2008

(54) METHOD AND APPARATUS FOR ALLOCATING TRAFFIC AMONG ROUTERS ON A COMPUTER NETWORK

(75) Inventors: Van Jacobson, Woodside, CA (US); Haobo Yu, Sunnyvale, CA (US)

(73) Assignee: Packet Design, Inc., Palo Alto, CA (US)

( * ) Notice: Subject to any disclaimer, the term of this patent is extended or adjusted under 35 U.S.C. 154(b) by 725 days.

(21) Appl. No.: 10/298,938

(22) Filed: Nov. 18, 2002

(51) Int. Cl.
*G06F 15/173* (2006.01)
(52) U.S. Cl. ...................................... 709/238
(58) Field of Classification Search ................ 709/224, 709/226, 238–245
See application file for complete search history.

(56) References Cited

U.S. PATENT DOCUMENTS

| | | | |
|---|---|---|---|
| 6,130,890 A * | 10/2000 | Leinwand et al. .......... 370/400 |
| 6,292,832 B1 * | 9/2001 | Shah et al. .................. 709/226 |
| 6,636,895 B1 * | 10/2003 | Li et al. ...................... 709/238 |
| 6,914,886 B2 * | 7/2005 | Peles et al. ................. 370/254 |
| 2002/0163884 A1 * | 11/2002 | Peles et al. ................. 370/229 |
| 2003/0012145 A1 * | 1/2003 | Bragg ......................... 370/254 |

OTHER PUBLICATIONS

Stevens, W. Richard, "TCP/IP Illustrated, vol. 1: The Protocols", 1994, Addison Wesley, Chapter 20.6.*

* cited by examiner

*Primary Examiner*—Bunjob Jaroenchonwanit
*Assistant Examiner*—Julian Chang
(74) *Attorney, Agent, or Firm*—Innovation Partners; Charles E. Gotlieb

(57) ABSTRACT

A system and method allocates ranges of addresses that are reachable by more than one border router to one of the border routers capable of reaching those ranges of addresses and advertises those addresses as being reachable only by the border router to which each such range of addresses were assigned.

30 Claims, 5 Drawing Sheets

METHOD AND APPARATUS FOR ALLOCATING TRAFFIC AMONG ROUTERS ON A COMPUTER NETWORK

FIELD OF THE INVENTION

The present invention is related to computer software and more specifically to computer networking software.

BACKGROUND OF THE INVENTION

Networks of computer systems may be made of interconnected autonomous systems. Each autonomous system (AS) contains communication equipment such as conventional routers that can send and receive traffic. Traffic may be sent to, or received from, internal networks of computer systems operated by parties who have contracted with the operator of the AS for service, or to or from other autonomous systems. An operator of an AS may be a conventional Internet service provider or another entity. Each AS is assigned one or more blocks of addresses that they can optionally divide and assign to internal networks of that AS.

Traffic sent to or received from remote autonomous systems is sent and received via border routers at the edge of each autonomous system. To allow each autonomous system to identify which remote autonomous system can forward traffic to a particular network destination, the border routers of each autonomous system periodically provide, to the border routers of each autonomous system to which they are directly connected, information about the addresses of each network destination for which they can handle traffic. Because the addresses will usually include a large number of addresses, blocks of addresses are each described as a range of addresses by specifying an address and mask pair. A network address is in the range if the address, logically ANDed with the mask matches the address in the pair. The border routers in each receiving AS receive this information and provide this information to the other devices in the same AS as the receiving AS or transmit it to a route reflector, which forwards the information to the other routers in the same AS as the receiving AS.

More than one border router may thus advertise that it can reach a same network destination advertised by another border router. The other routers in the AS choose, from among those border routers that advertise that they can reach a network destination, using various parameters, including the cost metrics assigned to the links in the shortest path to each such border router. If the combination of other parameters used to select a border router are the same, the border router having the shortest least cost path will be selected.

The communication equipment in each AS uses the information it receives from other autonomous systems as well as information about the internal networks of that autonomous system to build one or more routing tables to identify the optimal route within the AS for every network destination. When the communication equipment of an AS receives a communication to be forwarded, it compares the destination address in the header of the communication with the entries in the routing tables. The routing tables for a piece of communication equipment tell that piece of communication equipment how to forward the communication to the next piece of communication equipment in the direction of the optimal path.

However, there is a problem with this approach. Although there may be several border routers capable of reaching a network destination, traffic arriving at an ingress point of an AS and having a certain destination will always take the same path through an AS to reach that destination. In some cases, multiple ingress points on a network will funnel traffic through the same egress point of the network to reach a set of external networks. This is because the routes are selected without regard for the amount of traffic flowing over a particular path. A point of origin that receives a large amount of traffic may forward that traffic via the same path to the destination, potentially saturating the least cost path while another path that could have been used sits relatively idle.

This problem is particularly troublesome in the case of traffic forwarded to a remote AS. There are often many border routers of the AS that could be used to forward the traffic from the AS to the remote AS, but the communication equipment uses the techniques described above and therefore an ingress router will always forward any traffic it receives to the same border router serving the remote AS. While the network costs may be adjusted to allow traffic received at different points of origin on the AS to take different paths, adjusting the network costs can be difficult to implement without adversely affecting other traffic, and there is still no effective solution when the bulk of the traffic to a destination is received at one point of origin. Because of the large installed base of network communication equipment, any solution to this problem must be compatible with such existing network communication equipment. What is needed is a system and method that can cause traffic received by one AS having a destination in another AS to take different paths, even if it is received at the same point of origin, and in a manner that is compatible with existing network communication equipment.

SUMMARY OF INVENTION

A system and method estimates or approximates the capacity of the path to each router in a set of routers that can serve a set of ranges of addresses, and estimates or approximates the traffic having a destination within each such range, assigns the ranges of addresses to the routers in the router set by matching the capacity with the traffic and advertises the router to which the range of addresses was assigned as the only router that can serve that range of addresses. The capacity of the path to each router in the router set may be estimated as being equal for each router, or may be identified as the smallest bandwidth along the least cost path to each such router from a designated ingress router. The amount of traffic received having a destination address that is within each range of addresses may be estimated by assuming that each range of addresses receives the same amount of traffic, or receives an amount of traffic in proportion to the number of addresses in the range. Other alternatives for estimating the amount of traffic each range of addresses will receive include determining the amount of traffic received by the designated ingress router that had a destination address within the range of addresses, said amount being measured either by number of packets or number of bytes. When assigning ranges of addresses to routers, ranges may be assigned in the order in which they were received, or they may be assigned in a different order, with a preference for ranges of addresses having a larger estimated or identified traffic impact. Ranges of addresses may be assigned as advertised by the routers, or they may be split to more closely match the capacity of the path to the routers. The system and method repeatedly updates the allocation of blocks of addresses to routers, and detects and attempts to prevent "thrashing", a circumstance in which one or more blocks of addresses are alternately assigned among the same few routers each time an assignment is made. Prevention of thrashing can include relaxing assignment tolerances or splitting the range of addresses involved.

DETAILED DESCRIPTION OF A PREFERRED EMBODIMENT

Figure 1:
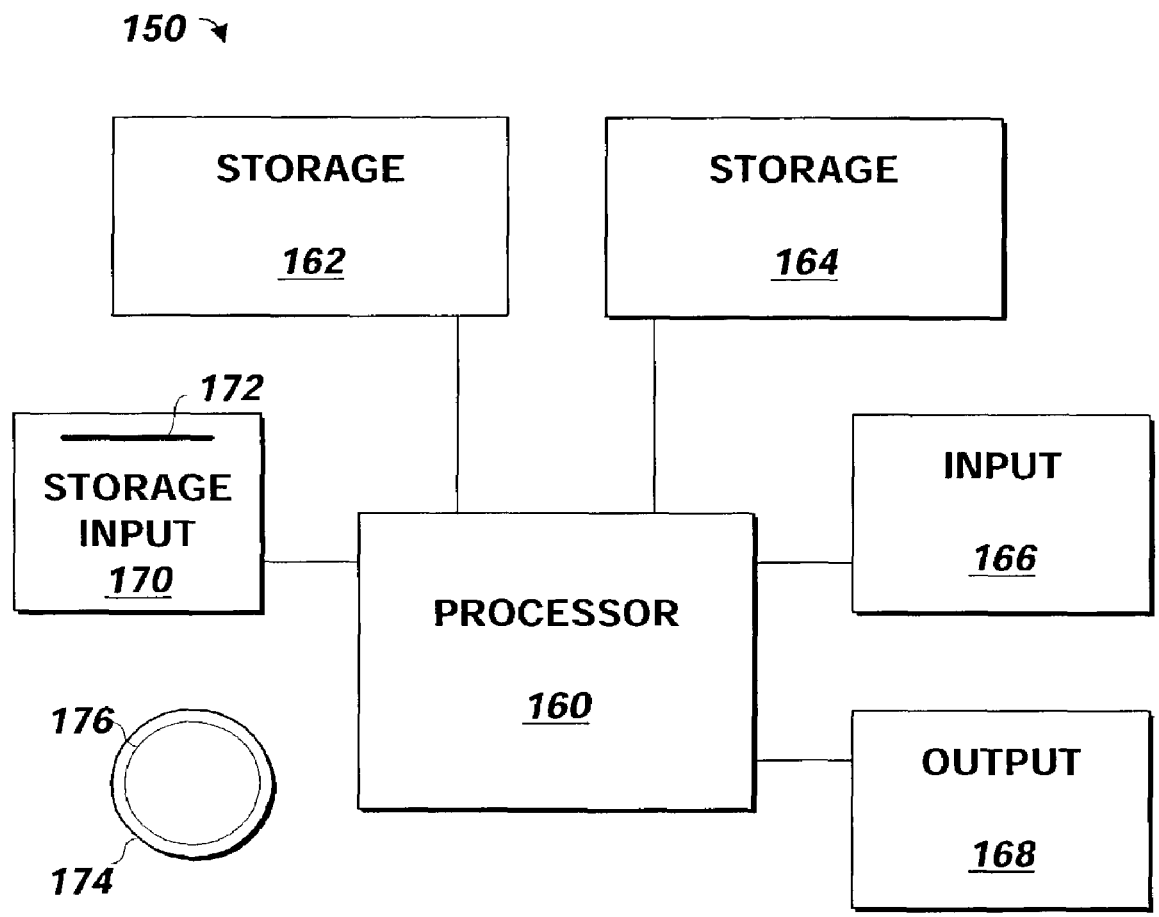
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (PAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc., of Mountain View, Calif., a PENTIUM-processor compatible personal computer system such as are available from DELL COMPUTER CORPORATION of Round Rock, Tex. running a version of the WINDOWS operating system (such as 95, 98, Me, XP, NT or 2000) commercially available from MICROSOFT CORPORATION of Redmond Wash. or a MACINTOSH computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or the conventional INTERNET EXPLORER browser available from MICROSOFT, above, although other systems may be used.

Figure 2:
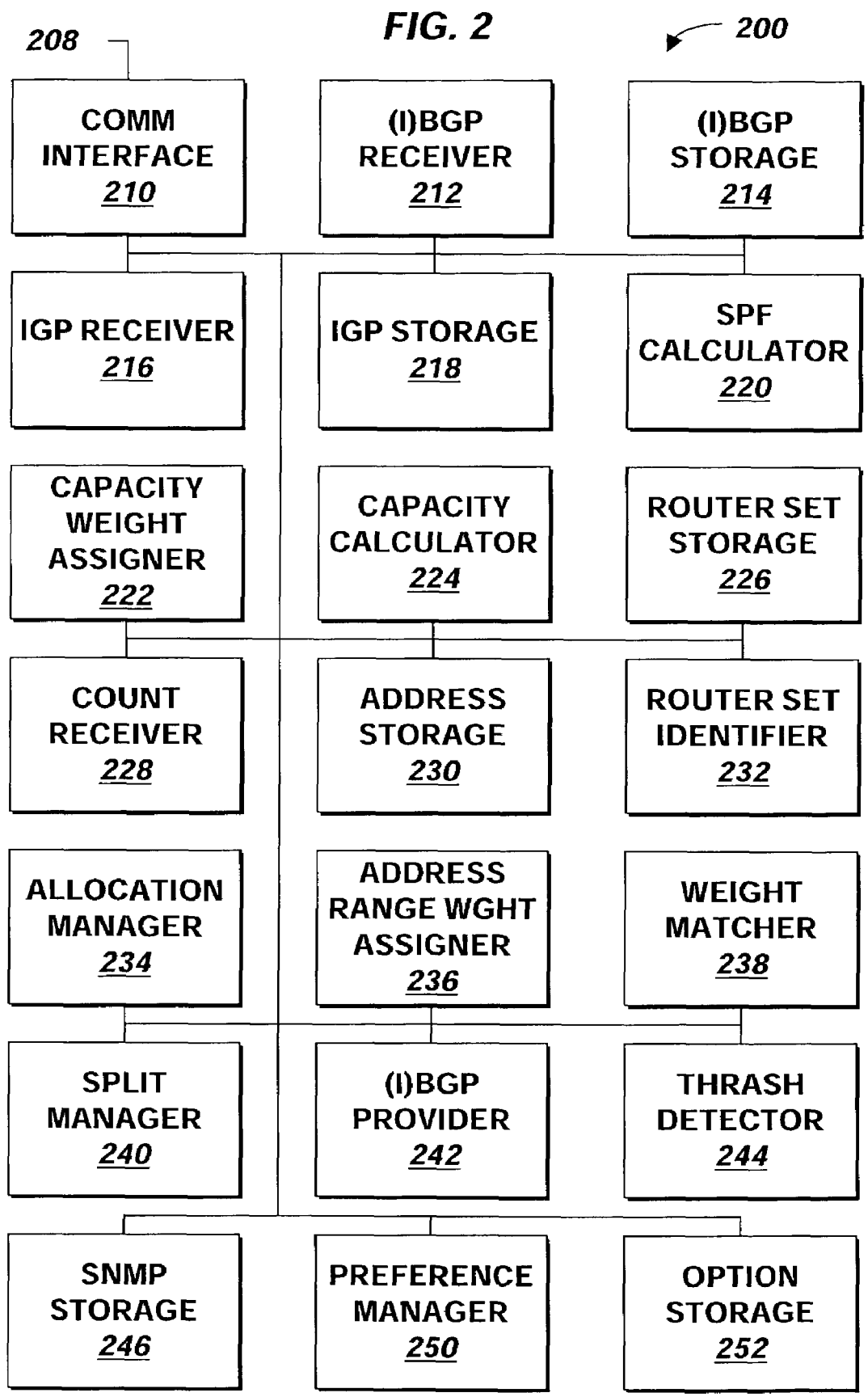
FIG. 2, is a block schematic diagram of an apparatus for allocating traffic across border routers that can carry it according to one embodiment of the present invention.

Referring now to FIG. 2, a system 200 for balancing traffic across routers in a computer network is shown according to one embodiment of the present invention. In one embodiment, all communication into or out of system 200 is made via input/output 208 of communication interface 210 which is coupled to a network such as the Internet or a local area network or both. Communication interface 210 is a conventional communication interface that supports TCP/IP or other conventional communication protocols.

Enter Options, Address of Ingress Router, Address of Representative Egress BGP Border Router or Ranges of Addresses.

In one embodiment, a system administrator enters to allocation manager 234 options for use as described below, and signals system administrator to begin operation. Allocation manager 234 receives the options from the user and builds and stores in option storage 252 an option list for use as described below. In one embodiment, options correspond to instructions for estimating or approximating the capacity of each path from an ingress router to each router in a set of routers described in more detail below. In addition, options include instructions for estimating or approximating the traffic generated by each range of addresses in a set of addresses as described in more detail below.

It isn't necessary that options be entered at all: the performance of the system 200 may be set in advance as if either type of options had been selected, without actually allowing the system administrator to set any such options.

In one embodiment, allocation manager 234 also receives from the system administrator an address of an ingress router, such as an ingress router from which significant traffic to be allocated is expected to be received. In one embodiment, an ingress router may be a border router of the AS, which is a router having a direct connection to a router in another AS, an interior (e.g. non-border) router of the AS, or either of these. Allocation manager 234 stores the IP address of the ingress router into options storage 252 for use as described below.

In one embodiment, allocation manager 234 also receives from a system administrator an identifier of the ranges of addresses to allocate among those border routers capable of forwarding traffic to those addresses. The ranges of addresses may be identified indirectly, using the IP address of one or more border routers, in which case, the ranges of addresses that will be allocated by system 200 as described below are all of the addresses advertised as reachable by that border router. In another embodiment, the ranges of addresses that system 200 is to allocate are specified by identifying one or more ranges of addresses via one or more network address and mask pairs. In still another embodiment, the system administrator couples a conventional packet sniffer or the conventional NETFLOW system commercially available from CISCO SYSTEMS, INC., or another similar device to a heavily loaded or other link and provides to allocation manager 234 the addresses that appear as the destination addresses in packets most often (e.g. the top 50). If more than one of these methods is supported, one of the options described above indicates which method or methods of specifying addresses to allocate is to be used. Allocation manager 234 stores the one or more addresses of border routers or the one or mote network address and mask pairs to allocate in option storage 252.

Gather Topology

When signaled by the system administrator, allocation manager 234 signals (I)BGP receiver 212. (I)BGP receiver 212 arranges participation in a set of conversations with the border routers using the conventional (I)BGP protocol. BGP is described in RFCs 1267 and 1268. All RFCs can be found on the website of the Internet Engineering Task Force, ietf.org. In one embodiment, a list of the IP addresses of all the border routers in the AS are stored via allocation manager 234 in options storage 252 via a user interface provided by allocation manager 234 and this list of addresses of the border routers is used to arrange participation in the conversations by (I)BGP receiver 212.

(I)BGP receiver 212 receives routing information from the border routers of the AS via the conversations it arranges. This information includes, for each border router in the AS, various ranges of addresses of external networks of other autonomous systems reachable by that border router. In one embodiment, these ranges of addresses are represented using the network address and mask pair technique described above, although other embodiments may use other techniques to represent a range of addresses.

(I)BGP receiver 212 uses the (I)BGP information to build a series of entries in (I)BGP storage 214. Each entry represents one router of the AS, and contains the IP address of the router and a list of addresses and masks that indicate the ranges of addresses that are reachable via that router as described by the (I)BGP information received from that router.

When (I)BGP receiver 212 has received (I)BGP information from all of the routers in the list in options storage 252, (I)BGP receiver 212 signals allocation manager 234.

Initialization

When signaled by (I)BGP receiver 212, allocation manager 234 signals router set identifier 222. Router set identifier 232 retrieves the egress router address specified by the user or the set of addresses and mask pairs or highest-used destination addresses specified by the user and stored in option storage 252 and uses this information to identify the ranges of addresses to be allocated as described herein. If the IP address of an egress router was specified by a system administrator, router set identifier 232 builds the router set by retrieving the specified egress router IP address, or addresses from option storage 252, scanning (I)BGP storage 214, locating the entry for the specified egress router or routers and retrieving the ranges of addresses stored in the entry for each such router as those ranges of addresses reachable by that router. If more than one egress router is specified, router set identifier 232 repeats the process for each such router and removes any duplicate ranges of addresses. Router set identifier 232 stores each of the ranges of addresses, including network address and masks, as entries in address storage 230.

If instead of the IP address of one or more routers, the system administrator specifies the ranges of addresses to be allocated, either manually or by identifying the most-used destination addresses as described above, router set identifier 232 inserts ranges of addresses corresponding to these addresses into individual entries in address storage 230, one specified range per entry. To insert ranges of addresses corresponding to a specified address or range, router set identifier 232 identifies the ranges of addresses in (I)BGP storage 214 that contain any portion of the specified addresses in option storage 252 and copies each such range as an entry in address storage 230. The entries in address storage 230 make up the set of addresses that will be allocated as described herein.

Router set identifier 232 then identifies the router set, which is the set of border routers of the AS to which the addresses in the address set will be allocated as described herein.

In one embodiment, a border router is assigned to the router set if the border router advertises itself as capable of reaching any of the addresses in the set of addresses stored in address storage 230. In another embodiment, a border router is assigned to the router set if the border router advertises itself as capable of reaching every address in the address set, and in still another embodiment, a border router is assigned to the router set if the border router advertises itself as capable of reaching all of the addresses in the address set and no others. These criteria for assigning routers to the router set is referred to herein as the router set assignment criteria which may correspond to options in option storage 252.

Router set identifier 232 scans the entries in (I)BGP storage 214 and finds entries that meet the router set assignment criteria. For each such entry that router set identifier 232 finds, router set identifier 232 builds an entry containing the IP address of the router in router set storage 226 and when all such entries have been built, router set identifier 232 signals capacity weight assigner 222.

Capacity and Use

System 200 next estimates the capacity of each path between the ingress router and each of the routers in the router set and estimates the current traffic of each range of addresses in the set of addresses, and then assigns each range of addresses in the set of addresses to one of the routers in the router set.

There are several possible ways to determine or approximate both the capacity of a path and the generated from a range of addresses. In one embodiment, system 200 supports a number of techniques for computing and/or estimating both capacity and traffic, and allows the system operator to choose among these algorithms by selecting options corresponding to the desired algorithms.

Capacity weight assigner 222 assigns a path weight to the capacity of each of the paths from the ingress router to each of the routers in the router set. Depending on the options, capacity weight assigner 222 may signal SPF calculator 220 to do the construction before assigning the weights.

Capacity weight assigner 222 retrieves the list of options from option storage 252, and examines the option list. One option for determining the capacity indicates that to identify the capacity of each path from the ingress router to a router in the router set, it is to be assumed that all paths have the same, identical capacity. Another option for determining the capacity indicates that it should be assumed that each path to a router in the router set has a capacity inversely proportional to the lowest bandwidth link in the path from the ingress router to that router. Capacity weight assigner 222 notes whether the option for assuming all paths have the same capacity is selected.

If such an option is selected, capacity weight assigner 222 signals capacity calculator 224. Capacity calculator 224 retrieves the option from option storage 252 and calculates a weight, herein referred to as a path weight, for each path between the ingress router and the routers in the router set, referred to as "designated paths". In one embodiment, the path weight is a number between zero and one such that the sum of the path weights of all such paths is equal to one, although other embodiments may use other ways of weighting the path from the designated ingress router to each router in the router set.

If option indication corresponds to equal path weights for each path, capacity calculator 224 calculates a path weight for each designated path as (1/n), where "n" is the number of routers in the router set, which corresponds to the number of entries in router set storage 226. For example, if there are four routers in the router set and thus four designated paths, capacity calculator 224 calculates a path weight of 0.25 (¼) for each designated path.

Capacity calculator 224 counts the number of entries (each entry corresponding to a designated path) in router set storage 226, computes the path weight as described above and stores the path weight for each designated path in router set storage 226 in the entry for the router.

As noted above, another option for identifying a path weight is to assign a path weight for each router in the router set that is proportional to the minimum link bandwidth in the least cost path between the ingress router and that router. When the system administrator selects this option using allocation manager 234, allocation manager signals IGP receiver 216. When signaled, IGP receiver 216 arranges participation in a set of conversations with the internal routers of the AS using one or more conventional IGP protocols such as ISIS or OSPF. OSPF is described in RFC 1583, and IS-IS is described in RFC 1195.

IGP receiver 216 receives topology information from these internal routers, and stores this information in IGP storage 218. Once IGP receiver 216 has received the topology information for a sufficient period of time to ensure that all routers in the AS have communicated their topology information, IGP receiver 216 marks IGP storage 218 to indicate that the information in IGP storage 218 represents a complete version of the latest topology information available to system 200. In one embodiment, IGP receiver 216 may use conventional IGP synchronization mechanisms to verify that IGP receiver has received the topology information for all routers in the AS so that IGP receiver need not wait for a complete cycle for the one or more IGP protocols in use.

As described above, router set identifier 232 signals capacity weight assigner 222 when router set identifier 232 identifies the routers in the router set, and capacity weight assigner checks the options. If the options indicate that paths are to be weighted proportionally to the lowest bandwidth, instead of signaling capacity calculator 224 as described above, capacity weight assigner 222 signals SPF calculator 220.

SPF calculator 220 waits for IGP storage 218 to be marked as described above, and then uses the entries in router set storage 226 and the information in IGP storage 218 to compute the least cost paths within the AS between the specified ingress router and the routers in the router set.

To compute the least cost paths, SPF calculator 220 uses the IGP information in IGP storage 218 to build a graph of the AS, with each node in the graph representing a node in the AS (e.g. a router, an internal network, a logical router etc.) with links between nodes representing the physical or logical connections between each of the nodes and including the cost or other metric assigned to the connection. SPF calculator 220 retrieves from option storage 252 the address of the ingress router and, for each of the routers in the router set stored in the entries in router set storage 226, uses the graph in IGP storage 218 and a conventional path calculation algorithm such as the Shortest Path First (SPF) algorithm (also known as the Dijkstra algorithm) to identify the least cost path between the ingress router and each router in the router set. A description of how Dijkstra's algorithm is used to compute routes can be found in "OSPF: Anatomy of an Internet Routing Protocol", by J. Moy, Addison-Wesley, 1998, which is hereby incorporated by reference herein in its entirety. SPF calculator 220 identifies the least cost path between the ingress router and each router in the router set as a series of routers of the AS, beginning with the ingress router and ending with one of the routers in the router set. In another embodiment, routing tables are built for each router as needed and routing tables are used in place of the path calculation algorithm. For each router in the router set, SPF calculator 220 stores in the entry corresponding to that router in router set storage 226 the IP addresses of each router in the least cost path and the bandwidth of each link to each such router.

The bandwidth of the link may be obtained using the TE extensions to the IGP information stored in IGP storage 218, or SPF calculator 220 may log into each such router and obtain the bandwidth information by parsing the router configuration file or remotely, using SNMP queries. Alternately, the bandwidth of each link may be approximated by SPF calculator 220 by calculating the bandwidth as a function of the inverse of the cost or other metric assigned to the link. When SPF calculator 220 has completed adding the path information as described above to each entry in router set storage 226, SPF calculator 220 signals capacity weight assigner 222, which signals capacity calculator 224.

Capacity calculator 224 retrieves the value of the option for considering path bandwidth when figuring capacity to capacity calculator 224. If capacity calculator 224 determines that path bandwidth is to be considered when figuring the weight of the path, capacity calculator 224 identifies the bandwidth of the path between the ingress router and each border router in the router set stored in each entry in router set storage 226 by selecting the smallest bandwidth in the entry corresponding to that router in the router set. For each entry in router set storage 226, capacity calculator 224 copies the smallest such bandwidth into the entry for use as described below.

Capacity calculator 224 calculates a path weight for each router in the router set by dividing the bandwidth assigned to that router by the sum of the smallest bandwidths of each of the routers in the router set. As an example, consider the three twin paths and the assigned bandwidths in the following table:

| Twin Router IP address | Smallest Bandwidth In Least Cost Path From Ingress Router |
|---|---|
| 10.1.1.1 | 500 |
| 10.1.1.2 | 1200 |
| 10.1.1.3 | 700 |

The path weight of 10.1.1.1 is (500/(500+1200+700)=0.208, the path weight of 10.1.1.2 is (1200/(500+1200+700)=0.500, and the path weight of 10.1.1.3 is (700/(500+1200+700)=0.292.

Capacity calculator 224 stores the path weight for each router in router set storage 226 in the entry for that router, and signals allocation manager 234.

Assignment of Address Weights

Once the capacity of all the paths between the ingress router and each of the routers in the router set has been estimated or calculated as described above, allocation manager 234 receives the signal from capacity calculator 224 and signals address range weight assigner 236.

Address range weight assigner 236 retrieves the option list from option storage 252 and, as described below, weights the address ranges in the set of addresses so that the address ranges can later be allocated among the routers in the router set as described herein.

There are a number of ways to assign weights to ranges of addresses. One way is to assign each range of addresses the same weight. Another way is to give address ranges with large numbers of addresses larger weights than address ranges with small numbers of addresses in proportion to the number of addresses in the range. Another way of assigning weights to ranges of addresses is to weight each range of addresses in proportion to a measure of traffic received by the ingress router that has a destination in the range, either using the number of bytes or number of packets as the measure of traffic. In one embodiment, the way weights are assigned are selectable via the list of options stored in option storage 252. Each of these ways will now be described.

Address range weight assigner 236 examines the list of options in option storage 252. If the "allocate by range" option is selected, address range weight assigner 236 selects the first address range in address storage 230. Address range weight assigner 236 examines the "measure of range" option to determine the requested weighting. If the "measure of range" option indicates each range receives the same weight, address range weight assigner 236 assigns an interim weight of one to the selected address range and stores the weight in address storage 230. If the "measure of range" option instead indicates that each range is weighted in proportion to the number of addresses in the range, address range weight assigner 236 identifies the number of addresses in the selected range and stores in the entry an interim weight equal to the number of addresses in that range of addresses. Address range weight assigner 236 selects the next address range in the address storage 230 and repeats the assignment of an interim weight to the selected range as described above until address range weight assigner 236 has assigned an interim weight to all address ranges in address storage 230.

Address range weight assigner 236 normalizes the interim weights for each entry in address storage 230 by first adding together the interim weights of all of the address ranges in address storage 230 to form a sum. For each address range in address storage 230, address range weight assigner 236 divides the interim weight assigned to that range of addresses by the sum, and stores the result in the entry in address storage 230. This quotient is herein referred to as the weight or address weight.

As described above, there are other ways to assign weights to addresses. Two such other ways involve measuring the actual traffic passing through the specified ingress router for each range of addresses in address storage 230, and weighting each address range in proportion to that measure of traffic. For example, the measure of traffic may be either the byte count of such traffic, which is the amount of bytes in the traffic or the "hit count", which is the number of packets in the traffic. Either measure may be used.

Address range weight assigner 236 examines the option list in option storage 252, and determines if the "allocate by traffic" option is set. If the "allocate by traffic" option is set, address range weight assigner 236 signals count receiver 228.

In one embodiment, if the allocate by traffic option is set, a "measure of traffic" option to use in the allocation may be set to either of two values: "hit count" or "byte count". As measured by the ingress router, a hit count for an address measures the number of packets received for that address and a byte count for an address measures the number of bytes in the packet each time a packet is received for that address. To obtain the proper count, address range weight assigner 236 signals count receiver 228.

When signaled, count receiver 228 gathers statistics on traffic flowing from the ingress router to each of the range of addresses in the set of addresses in address storage 230. To gather such statistics, in one embodiment, count receiver 228 uses a conventional protocol such as the SNMP protocol to request and receive data byte or hit counts for traffic flowing from the ingress router having the address in option storage 252, to the address ranges in the set of addresses. The SNMP protocol is documented in RFC 1157, "Simple Network Management Protocol", available at the website of the Internet Engineering Task Force, ietf.org. In another embodiment, count receiver 228 receives the such counts corresponding to the ingress router having the address in option storage 252 using traffic flow statistics provided by a conventional NETFLOW system commercially available from CISCO SYSTEMS, INC. of San Jose, Calif. Count receiver 228 requests from the ingress router specified in option storage 252 or the NETFLOW system or other similar system the data byte counts or the hit counts based on the value of the "measure of traffic" option it retrieves. These counts may be requested by address range or may be a larger range that includes some or all of the address ranges in the set of addresses, with count receiver 228 discarding the counts for addresses not in address ranges that are in the set of addresses. In still another embodiment, a simulation of traffic may be performed by count receiver 228 by recording the hit count or byte count of traffic received at the ingress router having the address stored in option storage 252 (such counts being recorded by count receiver 228 coupled to a conventional data collection port of that ingress router, such as a SPAN port of a CISCO router), separating traffic received into periods (e.g. 6 minute periods), sorting, for each range of addresses in address storage 230 the hit or byte count for each period, and selecting as the traffic count for an address range the $90^{th}$ percentile count of the traffic received over the simulation period (e.g. one day) and repeating the sorting and selecting steps described above for each range of addresses. Count receiver 228 stores the hit counts or byte counts into count storage 246.

In one embodiment, count receiver 228 receives data byte counts or hit counts for each individual address within the address ranges for which packets have been received. In such embodiment, count receiver 228 sums the data byte or hit counts for all of such addresses in each individual address range in address storage 230, and stores the byte or hit count in address storage 230 associated with the address range to which the count corresponds. When count receiver 228 has stored the counts for every range of addresses in address storage 230, count receiver 228 signals address range weight assigner 236.

Address range weight assigner 236 normalizes the counts in address storage 230 and stores the normalized counts in address storage 230 as the address weights for each range of addresses in address storage 230. To normalize the counts, address range weight assigner 236 adds together the data byte or hit count fields of each entry in address storage 230 to form a sum. Address range weight assigner 236 selects the first range of addresses in address storage 230 and divides the data byte count of the selected entry by the sum and stores the result associated with that range of addresses. This result is herein referred to as the address weight. Address range weight assigner 236 selects the next range of addresses in address storage 230 and repeats the process as described above until address range weight assigner 236 has computed and stored an address weight for every range of addresses in address storage 230. Once address range weight assigner 236 has normalized and stored the address weights for all of the ranges of addresses in address storage 230, address range weight assigner 236 signals allocation manager 234.

Allocating Traffic to Paths

Allocation manager 234 receives the signal and signals weight matcher 238. At this point, the paths between the ingress router and each router in the router set in router set storage 226 have been assigned a path weight as described above; each address range in the set of addresses has been assigned an address weight as described above. Weight matcher 238 uses these factors to allocate address ranges to routers in the router set as will now be described.

As described herein, address ranges are allocated using a conventional bin packing algorithm, which is NP-hard. However, in other embodiments, other heuristic algorithms may be used in place of the greedy algorithm described herein.

In one embodiment, weight matcher 238 sorts the routers in router set storage 226 in descending order of path weights and sorts the address ranges in address range storage 230 in descending order of address weights. Ties may be broken using any consistent technique, such as by sorting ties for weights in routers by order of IP address of the router, and sorting ties in weights of address ranges in order of the starting address.

Weight matcher 238 selects the first router in the router set in router set storage 226, sets a running total to zero and selects the first address range in address storage 230. Weight matcher 238 adds the address weight from the selected address range to the running total for that router, and compares the running total to the path weight of the selected router.

If the running total, less an allocation tolerance amount (which, in one embodiment, is specified by the system administrator as an option and stored in option storage 252 as described above) is not greater than the path weight of the selected router, then weight matcher 238 adds the IP address of the selected router to the selected address range in address storage 230. If there are more address ranges in address storage, weight matcher 238 selects the next address range in address storage 230 and repeats the process described above until weight matcher 238 has assigned each set of address ranges to a path or the running total is greater than the path weight of the selected router by an amount that exceeds the allocation tolerance.

If the running total is greater than the path weight of the selected router by an amount that exceeds an allocation tolerance stored as an option in option storage 252 as described above, in one embodiment, weight matcher 238 does not add the IP address of the selected router to the selected address range in address storage 226. Instead, weight matcher 238 selects the next router in the router set in router set storage 226, zeros the running total, and repeats the process described above, beginning with the address range just selected.

In one embodiment, each address range is assigned to a router in the router set without changing any of the ranges of addresses either received from the system administrator or from the designated egress router. In another embodiment, address ranges may be split into two or more address ranges to more closely allocate address weights to path weights.

In the embodiment in which address ranges may be split, an option enables or disables splitting, and weight matcher 238 checks this option. If the option to allow splitting is disabled, weight matcher 238 proceeds as described above. If the option allows splitting and if the running total is greater than the path weight plus the allocation tolerance, weight matcher 238 compares the running total to the path weight of the selected router plus the allocation tolerance (which may be zero or near zero if splitting is allowed). If the running total is greater than the path weight of the selected router (or greater by an amount greater than the allocation tolerance), then weight matcher 238 signals split manager 240, and sends split manager 240 the difference by which the running total exceeds the path weight, or exceeds the path weight plus the allocation tolerance, and the identifier of the address range. Split manager 240 splits the address range in two as described below and signals weight matcher 238. Weight matcher 238 assigns the first address range into which the original address range has been split to the selected router as described above, selects another router in the router set, sets the running total to zero, and repeats the process starting with the other portion of the address range into which the original address range has been split. The other router selected may split this address range again as part of the process described herein and an address range may be split any number of times.

A special case arises if the option to allow all address rages to be weighted equally is selected when splitting is allowed. In such embodiment, the two address ranges into which the selected address range is split may each be assigned a weight that is equal to half the former weight, and so weight manager 238 determines if the assignment of one of the ranges into which the address range is split that has half the weight of the old address range will still cause the running total to be exceeded, and if so, weight manager 238 does not split the address range.

In one embodiment, if the selected router is the last router in the router set, all unassigned address ranges are assigned to that router without regard to the weights, to ensure that all address ranges are so assigned.

In one embodiment, address ranges in the set of addresses are selected by weight matcher 238 for assignment to a router in the order in which they were sorted, or in the order in which they were provided, either by the system administrator or by the designated egress router or routers. In another embodiment, instead of selecting addresses in the order provided (descending by weight), weight matcher 238 scans the list of address ranges in address storage 230 and selects the one with the largest address weight that has not yet been assigned to a router, or the one with the largest address weight that has not yet been assigned that is lower than the difference between the running total and the path weight of the selected router. Routers may be selected for such assignments in descending order of weight, order of receipt or in another order.

Once weight matcher 238 has assigned ranges of addresses to paths, weight matcher 238 signals (I)BGP provider 242 and allocation manager 234. (I)BGP provider 242 acts as a route reflector to advertise to routers in the AS ranges of addresses that each router in the router set can reach as an exit border router. However, instead of advertising the actual ranges of addresses reachable by the routers in the router set, (I)BGP provider 242 advertises that each address range in the set of address ranges is only reachable by the router assigned to that address range by weight matcher 238 as described above. This can cause traffic from the address ranges in the set of addresses to be allocated among the routers in the router set in a manner more closely approximating the path weight of the router than may otherwise occur if each of the routers in the router set were advertised as capable of supporting all of the addresses they can reach.

To provide such information, (I)BGP provider 242 arranges participation in a set of conversations with the border routers and internal routers of the AS using a conventional IGP protocol, such as are described above. (I)BGP provider 242 uses the IGP protocol to advertise that the routers in the router set can reach addresses in the set of addresses as assigned in address storage 230 in the manner of a conventional route reflector. (I)BGP provider 242 also advertises addresses not in the set of addresses stored in address storage 230 as reachable by routers that advertised themselves as capable of reaching such addresses as would a conventional route reflector, even if such routers are in the router set.

Splitting a Range

As described above, during the course of matching address ranges to paths, weight matcher 238 may decide that a particular path is underallocated without adding the selected range, but overallocated with the selected range added. In one embodiment, weight matcher 238 signals split manager 240 to split the selected address range so that the address range may be allocated across more than one router in the router set.

Split manager 240 examines the list of options. If the "allocate by address" option is set, split manager 240 examines the "measure of range" option and determines if split manager 240 should weight each range of addresses equally. If the options indicate that addresses should be weighted by range with equal weights assigned to each range, split manager 240 splits the selected address range in half, allocating equal numbers of addresses to the two child ranges, and allocating half the address weight of the old range to each of the new ranges. Split manager 240 then replaces the old entry for the address range with two new entries as described herein. Other embodiments use other techniques for splitting address ranges and assigning weights to each of the new address ranges in the case that each address range is weighted equally. For example, in one embodiment, an address range may be split using other proportions to cause the address range being assigned to each router to better fit. Recursion may be used to split the address range and then resplit the first address range of the pair a sufficient number of times for a proper fit.

If the options indicate address weights for each range of addresses should be proportional to the number of addresses in the range, split manager 240 divides the weight needed for the first range by the address weight of the range being split to achieve a split quotient. Split manager 240 counts the number of addresses in the selected address range, and multiplies this number by the split factor, rounding to the nearest integer. This rounded product is herein referred to as the split number. Split manager 240 splits the selected address range in such a way that there are a number of addresses equal to the split number in the first child address range, and the remainder of the addresses from the selected range in the other child range, with the desired weight in the first range and the remainder of the weight from the address range being split in the second range, and stores this information as two entries in address storage 230 in place of the original address range.

As described above, split manager 240 examines the list of options. If the "allocate by traffic" option is set, split manager 240 scans count storage 246 and locates data byte counts or hit counts (based on the "measure of traffic" option) for addresses in the selected address range. Split manager 240 computes the total data bytes or packets sent to addresses in the selected address range and multiplies this number by the split factor. This product is herein referred to as the split count. Split manager 240 splits the selected address range in such a way that a number of bytes or packets as close as possible to the split count were sent to one child address range, and the remainder of the bytes or packets were sent to the other child address range. Weights are assigned to the child ranges as described above and the two child address ranges are stored in address storage 230 in place of the address range being split. In such embodiment, the SNMP counters are stored in count storage 246 when they are obtained by count receiver 228 as described above so that split manager 240 can perform the allocation as described above.

When the address range is split as described above, split manager 240 signals weight matcher 238 to complete matching address ranges to paths as described above. In addition, weight matcher 238 may sort the unassigned ranges of addresses to place the unassigned portion of the split address range into the proper order.

Allocation Manager

Once the procedure has been carried out as described above, allocation manager 234 waits for a period of time, and repeats the procedure described above. The procedure described above may be repeated over and over again until signaled by the system operator to halt. As paths change, routers go up or down, hit counts or byte counts change or other changes occur, the allocation of addresses to routers may be changed so that the allocation meets the requirements set forth by the options.

Thrashing

Consider the case where weight matcher 238 causes the allocation made during a prior iteration of the allocation process described above to be rebalanced and so on a subsequent iteration of the allocation process attempts to balance it by devising a second allocation as described above. Later, weight matcher 238 causes that the second allocation to be rebalanced, and devises another allocation that happens to be identical to the first allocation. In this case, weight matcher 238 may switch back and forth between the two allocations, neither of which it considers balanced. This condition is referred to herein as "thrashing".

In one embodiment, weight matcher 238 detects and avoids thrashing by signaling thrash detector 244 after every update of address storage 230. When weight matcher 238 signals thrash detector 244, which obtains the list of options in option storage 252. Thrash detector 244 receives the list of options and internally saves a copy of the current and the two most recent allocations of addresses to routers that is stored in address storage 230: the one prior to the current one in addition to the one before. Thrash detector 244 selects the first range of addresses in address storage 230 and compares the current assignment of the range to a router to the last saved allocation. If, for the selected router in the router set, the current configuration is different from the last configuration, but essentially the same as the next-to-last configuration, then thrash detector 244 selects the one or more address ranges that are being assigned back and forth among routers in address storage 230.

In one embodiment, thrash detector 244 marks any range of addresses that are being assigned between routers and causes the allocation tolerance to be increased for any such range of addresses by a specified percentage, such as 25% at the next iteration. If thrashing continues to occur, the marked range is marked again by thrash detector 244, causing the allocation tolerance to be increased again for any such marked ranges.

In another embodiment, thrash detector 244 marks each such address range and instead of raising the allocation tolerance, allows splitting to occur for the marked range. In such embodiment, thrash detector 244 marks each range of addresses as described above, and signals weight matcher 238 to cause the ranges of addresses to be reallocated as described above, but the marked address range or ranges are permitted to be split as described above, even if the options do not specify such splitting.

The use of the sorting described as being performed by weight matcher 238 can also reduce thrashing.

Figure 3A:
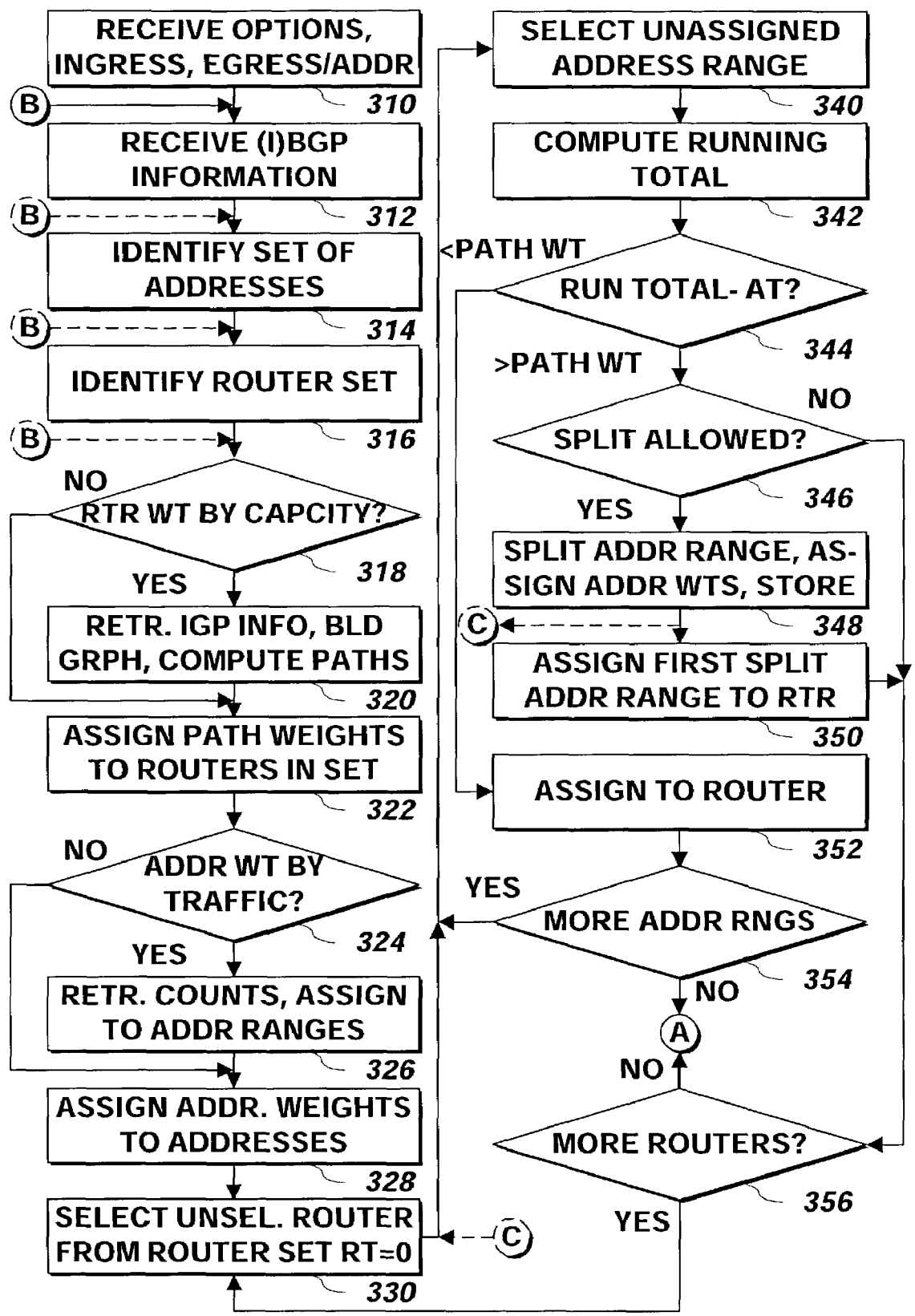
FIG. 3, consisting of FIGS. 3A and 3B, is a flowchart illustrating a method of allocating traffic across border routers that can carry it according to one embodiment of the present invention.

Referring now to FIG. 3, a flowchart illustrating a method of allocating ranges of addresses to routers that can carry traffic to such ranges is shown according to one embodiment of the present invention. Options, an address of an ingress router and either the address of one or more egress routers or one or more ranges of addresses or individual addresses (e.g. the most used destination addresses of a link as described above) to allocate are received 310 as described above. (I)BGP information is received 312 as described above. Sets of addresses are identified 314, either by identifying the ranges of addresses corresponding to the one or more egress routers having the identifiers received in step 310 or identifying ranges of addresses corresponding to the addresses or ranges received in step 310. Identifiers such as IP addresses of the routers in the router set are identified 316 as described above.

If the options indicate that routers will be weighted in proportion to a characteristic of the path between the ingress router and each router in the router set 318, IGP information is retrieved, a graph of the network is built and the paths between the ingress router and each of the routers in the router set are identified 320 as described above and the method continues at step 322, and otherwise 318, the method continues at step 322. At step 322, path weights are assigned to each of the routers in the router set as described above, and the method continues at step 324.

Figure 4:
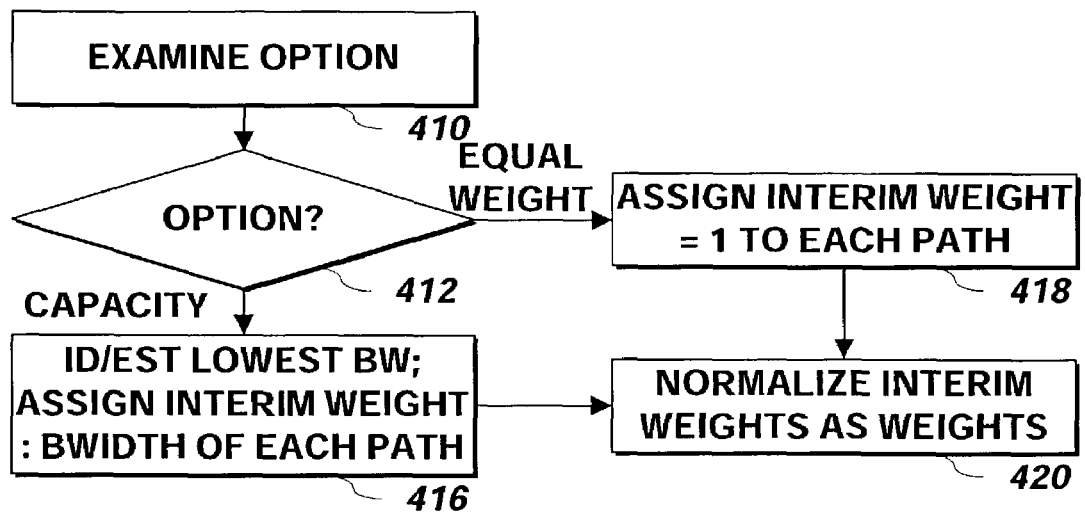
FIG. 4 is a flowchart illustrating a method of assigning path weights to border routers according to one embodiment of the present invention.

Referring momentarily to FIG. 4, a method of assigning path weights to routers described in step 322 is shown according to one embodiment of the present invention. An option is examined 410 and if the option indicates that routers are to be weighted by bandwidth of the path, a lowest bandwidth of the path between the ingress router and the router to which the path weight is being assigned is identified or estimated as described above and an interim weight is assigned proportional to the lowest bandwidth identified or estimated for the path 416 and the method continues at step 420. If the option indicates that the routers are to be weighted equally 412, each router is assigned 414 the same interim weight, such as 1 and the method continues at step 420. At step 420, the interim weights for each router are normalized as described above to produce the path weights for each such router.

Referring again to FIG. 3A, If the options indicate that address ranges are to be weighted by traffic 324, traffic measurements such as hit count or byte counts are retrieved 326 from the ingress router and the counts corresponding to each of the ranges of addresses in the set of addresses are assigned 328 to each such range of addresses.

Figure 5:
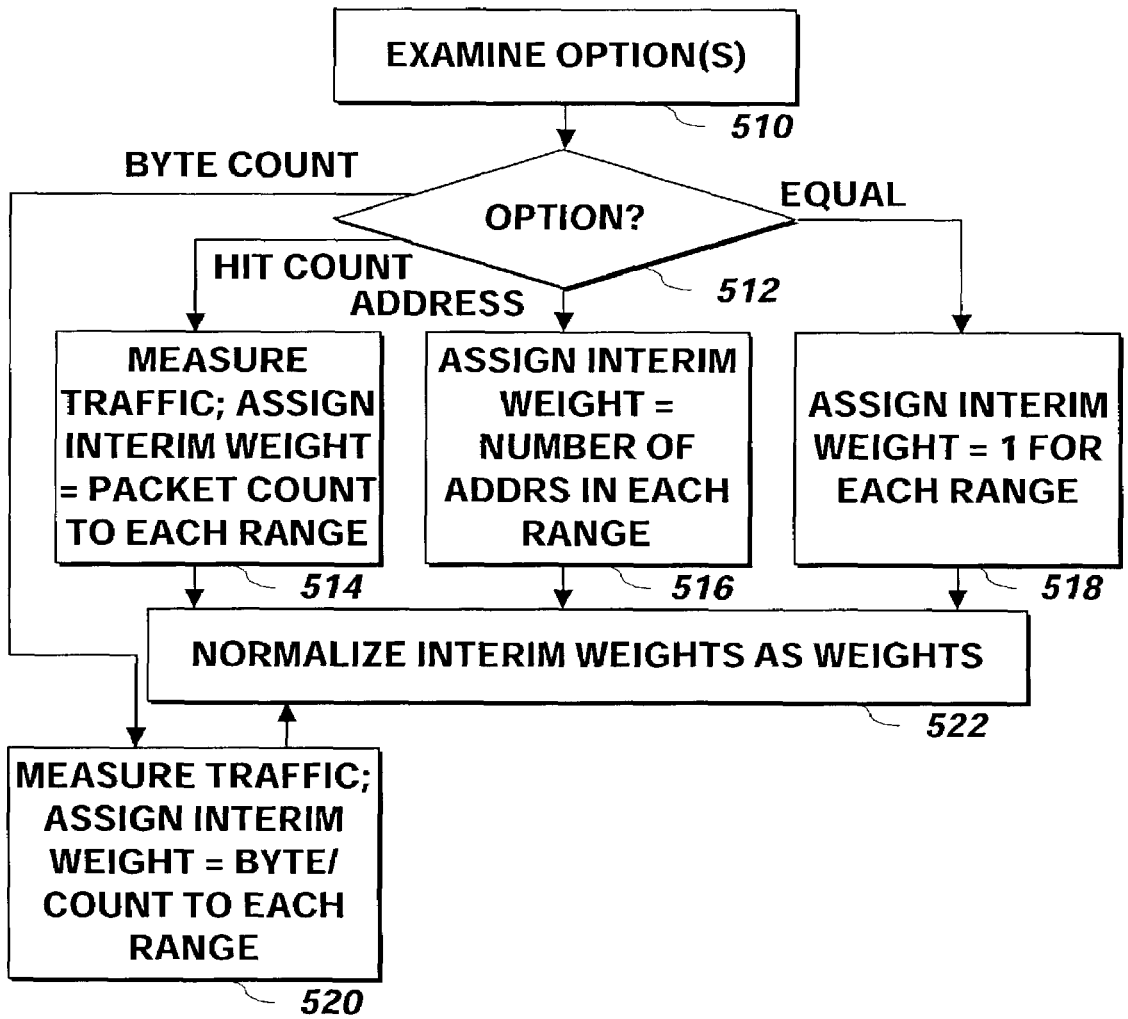
FIG. 5 is a flowchart illustrating a method of assigning address weights to ranges of addresses according to one embodiment of the present invention.

Referring momentarily to FIG. 5, a method of assigning address weights to ranges of addresses is shown according to one embodiment of the present invention. One or more options are examined. If the one or more options indicate that ranges of addresses are to be weighted by measure of traffic, and the measure is the hit count 512, interim weights are assigned equal to the packet counts for each range and the method continues at step 522. If the one or more options indicate that ranges of addresses are to be weighted by measure of traffic, and the measure is the byte count 512, interim weights are assigned equal to the byte counts for each range and the method continues at step 522. If the one or more options indicate that ranges of addresses are to be weighted by number of addresses in the range 512, interim weights are assigned as the number of addresses in each range and the method continues at step 522. If the one or more options indicate that ranges of addresses are to be weighted equally 512, a constant such as 1 is assigned as the interim weights for each range and the method continues at step 522. At step 522, the interim weights for each range of addresses are normalized to produce the address weights for each such range of addresses as described above.

Referring again to FIG. 3A, an unselected router is selected and a running total is set equal to zero 330. Step 330 may involve sorting the ranges of addresses and routers in descending order of weight as described above. An unassigned address range is selected 340. (As used herein, router is "unselected" or an address range is "unassigned" if the router has not been selected, or the address range has not been assigned, respectively, since the last time step 312 was executed). The running total is computed 342 by adding it to the weight of the address range selected in step 340.

If the running total, less the allocation tolerance (which may be received in step 310 as an option), is less than the path weight 344, the method continues at step 352. Otherwise 344, if splitting of address ranges is not allowed 346 (which may be specified as one of the options received in step 310), the method continues at step 356. Otherwise 346, the address range is split, weights are assigned to the address ranges into which the address range is split and the split address ranges are stored in place of the address range being split as described above 348. One of the split address ranges, such as the first, is assigned to the selected router 350 (the other is considered to be unassigned) and the method continues at step 356.

In one embodiment, step 340 follows step 348, as the address range is split in step 348 and then the two split address ranges are added to the list of unselected address ranges, in sorted order if desired, as part of step 348, and the split address ranges may be either assigned to a router or split again starting from step 340.

Figure 3B:
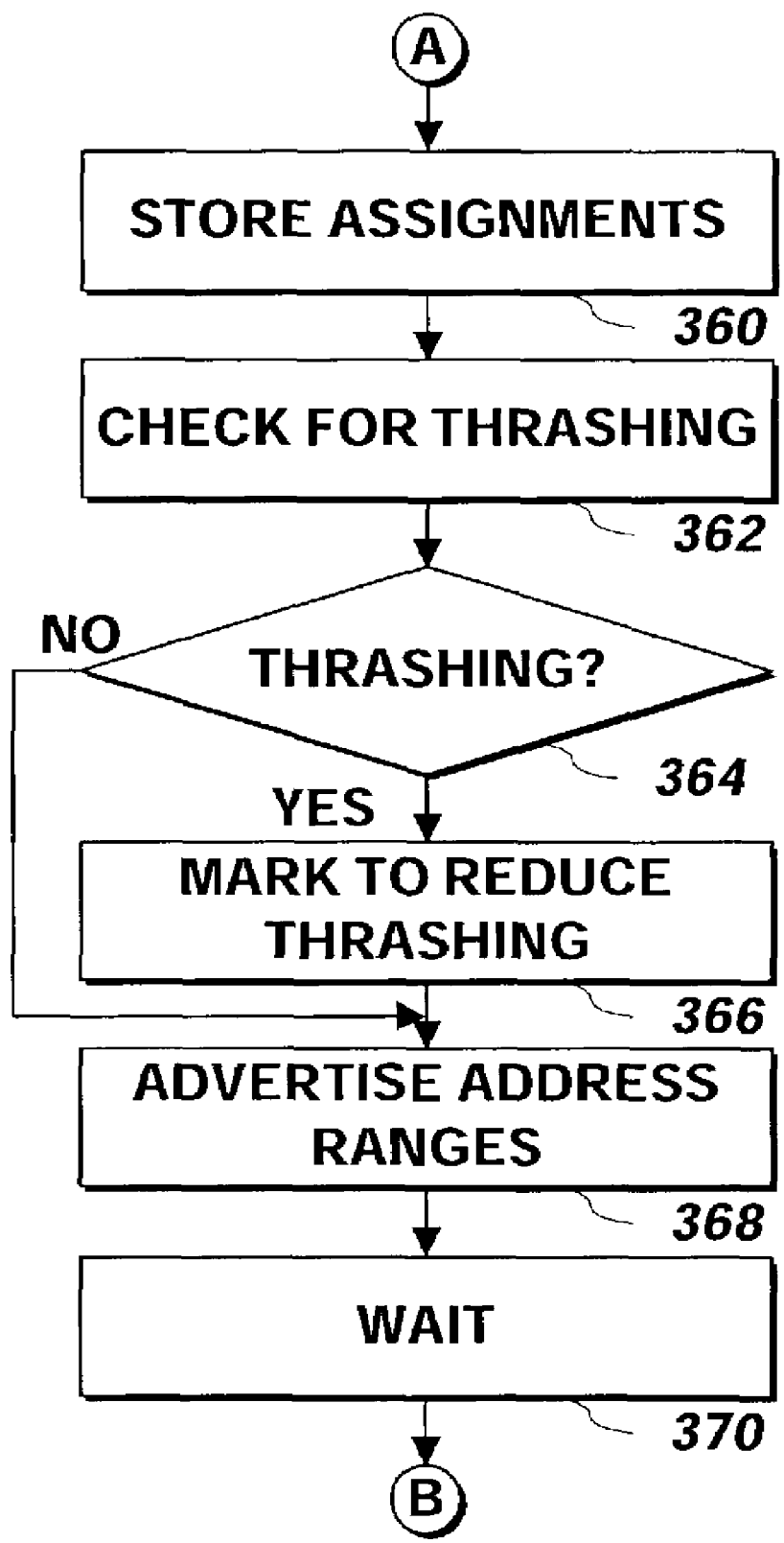

At step 352, the selected address range is assigned to the router and if there are more unassigned address ranges 354, the method continues at step 340, and otherwise, the method continues at step 360 of FIG. 3B. At step 356, if there are no more unselected routers, the method continues at step 360 of FIG. 3B and otherwise, the method continues at step 330.

At step 360 of FIG. 3B, the assignments of the address ranges are stored for determination of thrashing as described above. The assignments are compared with assignments previously made and stored to detect thrashing as described above 362. If thrashing of address ranges is detected 364, the address ranges are marked 366 to reduce thrashing as described above. The address ranges assigned and other address ranges received as part of the IGP information are advertised 368, with the assigned address ranges advertised as being reachable only by the border router to which the ranges are assigned, and nonassigned address ranges advertised as reachable by all routers that advertise that they are able to reach them as part of the (I)BGP information received in step 312.

The method waits 370 for a period of time, and then continues at step 312. Step 312 may be part of a continuously running process that is always available to receive (I)BGP information. In such case, step 314, 316 or 318 follows step 370 as shown by the dashed lines in the Figure.

What is claimed is:

1. A method of providing ranges of addresses reachable by each border router in a router set, the router set comprising a plurality of border routers, the method comprising:

for each of the border routers in the router set, receiving at least one range of addresses advertised as being reachable by said border router, all of the ranges of addresses comprising a set of a plurality addresses;

for each border router in the router set, assigning, responsive to at least one path identified as one that runs completely through an autonomous system that contains said border router via said border router at an ingress of said autonomous system, at least a portion of at least one of the ranges of addresses in the set of addresses to each of the border routers in the router set, each of the at least the portion comprising an assigned address range, wherein, for each of at least one of the border routers in the router set, the at least one assigned address range assigned to said border router and the at least one address range received from said border router differ from one another; and providing to a group of a plurality of routers internal to an autonomous system, for each border router in the router set:

the identifier of said border router; and the at least one assigned address range assigned to said border router.

2. The method of claim 1 wherein the assigning step is responsive to a total number of ranges of addresses in set of the plurality of addresses.

3. The method of claim 1 wherein the assigning step is responsive to a number of addresses in at least one range of addresses in the set of the plurality of addresses.

4. The method of claim 1 wherein the assigning step is responsive to at least one measure of traffic sent to at least some of the set of the plurality of addresses from at least one device.

5. The method of claim 4 wherein the measure of traffic comprises a number of packets.

6. The method of claim 4 wherein the measure of traffic comprises a number of bytes.

7. The method of claim 1 wherein the assigning step is responsive to a number of border routers in the router set.

8. The method of claim 1 wherein the assigning step is responsive to at least one capacity of at least one path to each of the border routers in the router set.

9. The method of claim 1 wherein, for each of at least two of the border routers in the router set, at least one of the at least one assigned range of addresses corresponds to a different portion of a single range of addresses in the set of the plurality of addresses.

10. The method of claim 1 wherein the assigning step is repeated at least twice, and a performance of one such assigning step is responsive to at least two prior performances of the assigning step.

11. A system for providing ranges of addresses reachable by each border router in a router set, the router set comprising a plurality of border routers, the system comprising:

a matcher, having an input operatively coupled for receiving, at least one identifier for each of the border routers in the router set and, for each of the border routers in the router set, at least one range of addresses advertised as being reachable by said border router, all of the ranges of addresses comprising a set of a plurality addresses, the matcher for, for each border router in the router set, assigning, responsive to at least one path identified as one that runs completely through an autonomous system that contains said border router via said border router at an ingress of said autonomous system, at least a portion of at least one of the ranges of addresses in the set of addresses to each of the border routers in the router set, each of the at least the portion comprising an assigned address range, wherein, for each of at least one of the border routers in the router set, the at least one assigned address range assigned to said border router and the at least one address range received from said border router differ from one another, the matcher additionally for providing at an output the assigned ranges of addresses, each associated with at least one identifier of the border routers in the router set to which the assigned ranges of addresses were assigned; and a provider for receiving at an input coupled to the matcher output the assigned ranges of addresses associated with the identifiers of the border routers in the router set to which the assigned ranges of addresses were assigned, the provider for providing to a group of a plurality of routers internal to an autonomous system, for each border router in the router set:

the identifier of said border router; and the at least one assigned address range assigned to said border router.

12. The system of claim 11 wherein the matcher assigns the assigned address ranges responsive to a total number of ranges of addresses in set of the plurality of addresses.

13. The system of claim 11 wherein the matcher assigns the assigned address ranges responsive to a number of addresses in at least one range of addresses in the set of the plurality of addresses.

14. The system of claim 11 wherein:

the matcher additionally has a measure of traffic input operatively coupled for receiving at least one measure of traffic sent to at least some of the set of the plurality of addresses from at least one device the matcher assigns the assigned address ranges responsive to the at least one measure of traffic sent to the at least some of the set of the plurality of addresses from at least one device received at the matcher measure of traffic input.

15. The system of claim 14 wherein the measure of traffic comprises a number of packets.

16. The system of claim 14 wherein the measure of traffic comprises a number of bytes.

17. The system of claim 11 wherein the matcher assigns the assigned address ranges responsive to a number of border routers in the router set.

18. The system of claim 11 wherein:

the matcher additionally comprises a capacity input operatively coupled for receiving at least one capacity of at least one path to each of the border routers in the router set; and the matcher assigns the assigned address ranges responsive to a capacity of at least one path to each of the border routers in the router set received at the matcher capacity input.

19. The system of claim 11 wherein, for each of at least two of the border routers in the router set, at least one of the at least one assigned range of addresses corresponds to a different portion of a single range of addresses in the set of the plurality of addresses.

20. The system of claim 11 wherein the matcher assigns the assigned address ranges at least three times, and a performance of one such assignment is responsive to at least two prior performances of such assignment.

21. A computer program product comprising a computer useable medium having computer readable program code embodied therein for providing ranges of addresses reachable by each border router in a router set, the router set comprising a plurality of border routers, the computer program product comprising computer readable program code devices configured to cause a computer system to:

for each of the border routers in the router set, receive at least one range of addresses advertised as being reachable by said border router, all of the ranges of addresses comprising a set of a plurality addresses;

for each border router in the router set, assign, responsive to at least one path identified as one that runs completely through an autonomous system that contains said border router via said border router at the ingress of said autonomous system, at least a portion of at least one of the ranges of addresses in the set of addresses to each of the border routers in the router set, each of the at least the portion comprising an assigned address range, wherein, for each of at least one of the border routers in the router set, the at least one assigned address range assigned to said border router and the at least one address range received from said border router differ from one another; and provide to a group of a plurality of routers internal to an autonomous system, for each border router in the router set:

the identifier of said border router; and the at least one assigned address range assigned to said border router.

22. The computer program product of claim 21 wherein the computer readable program code devices configured to cause the computer system to assign are responsive to a total number of ranges of addresses in set of the plurality of addresses.

23. The computer program product of claim 21 wherein the computer readable program code devices configured to cause the computer system to assign are responsive to a number of addresses in at least one range of addresses in the set of the plurality of addresses.

24. The computer program product of claim 21 wherein the computer readable program code devices configured to cause the computer system to assign are responsive to at least one measure of traffic sent to at least some of the set of the plurality of addresses from at least one device.

25. The computer program product of claim 24 wherein the measure of traffic comprises a number of packets.

26. The computer program product of claim 24 wherein the measure of traffic comprises a number of bytes.

27. The computer program product of claim 21 wherein the computer readable program code devices configured to cause the computer system to assign are responsive to a number of border routers in the router set.

28. The computer program product of claim 21 wherein the computer readable program code devices configured to cause the computer system to assign are responsive to at least one capacity of at least one path to each of the border routers in the router set.

29. The computer program product of claim 21 wherein, for each of at least two of the border routers in the router set, at least one of the at least one assigned range of addresses corresponds to a different portion of a single range of addresses in the set of the plurality of addresses.

30. The computer program product of claim 21 wherein the computer readable program code devices configured to cause the computer system to assign comprise computer readable program code devices configured to cause the computer system to perform said assignment at least thrice, and a performance of one such assignment is responsive to at least two prior performances of such assignment.

* * * * *